UNITED STATES PATENT OFFICE.

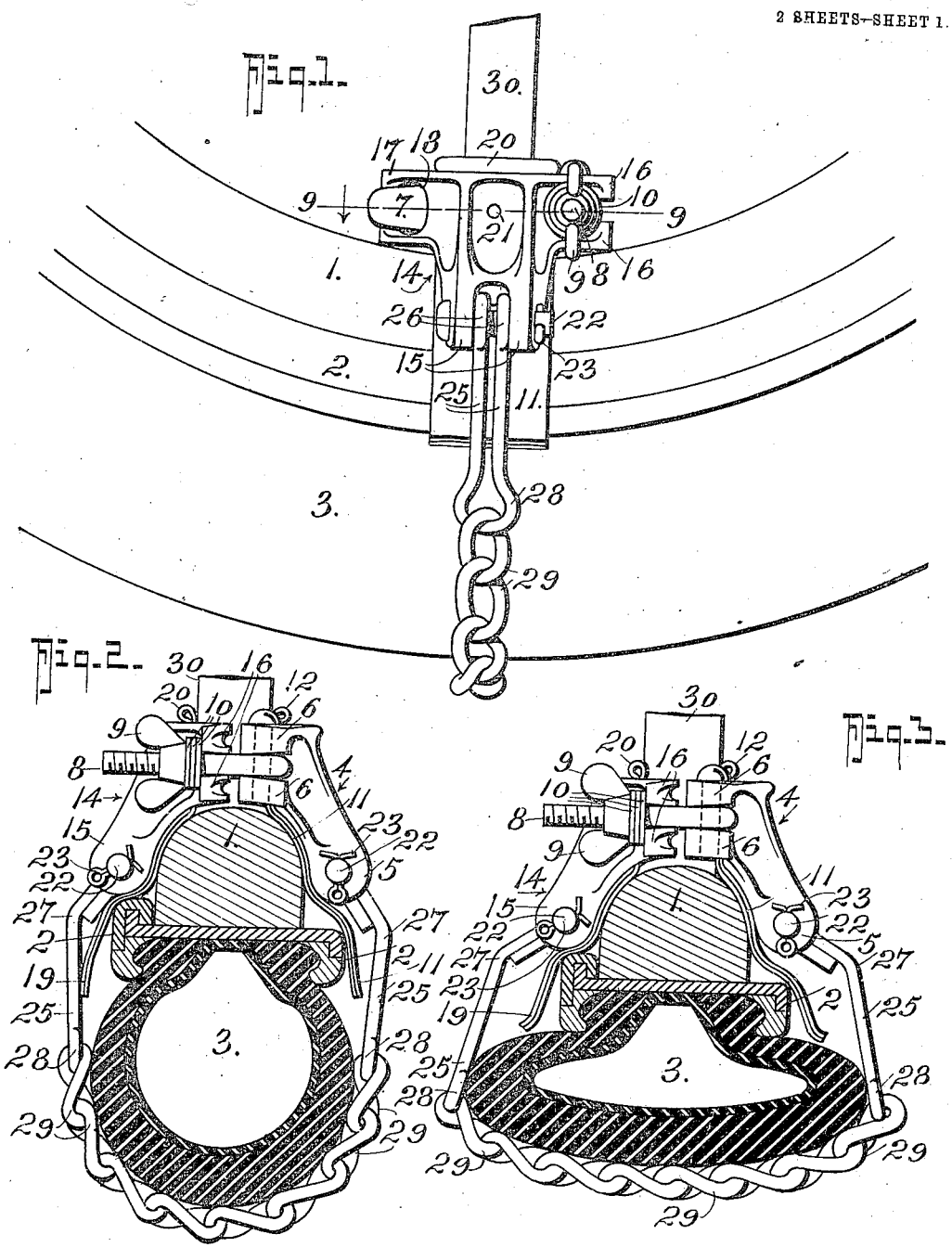

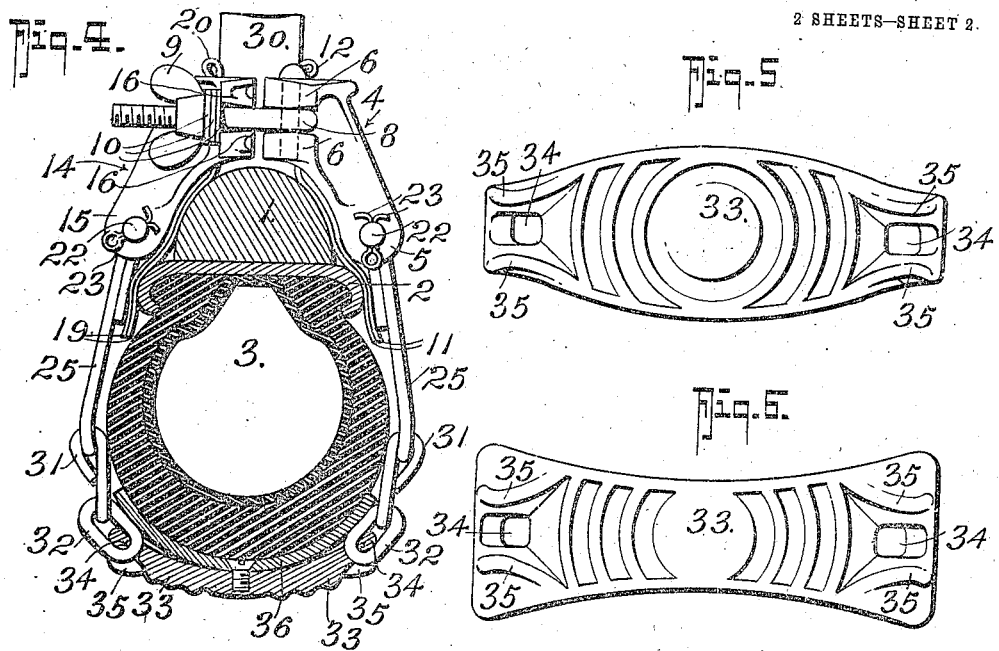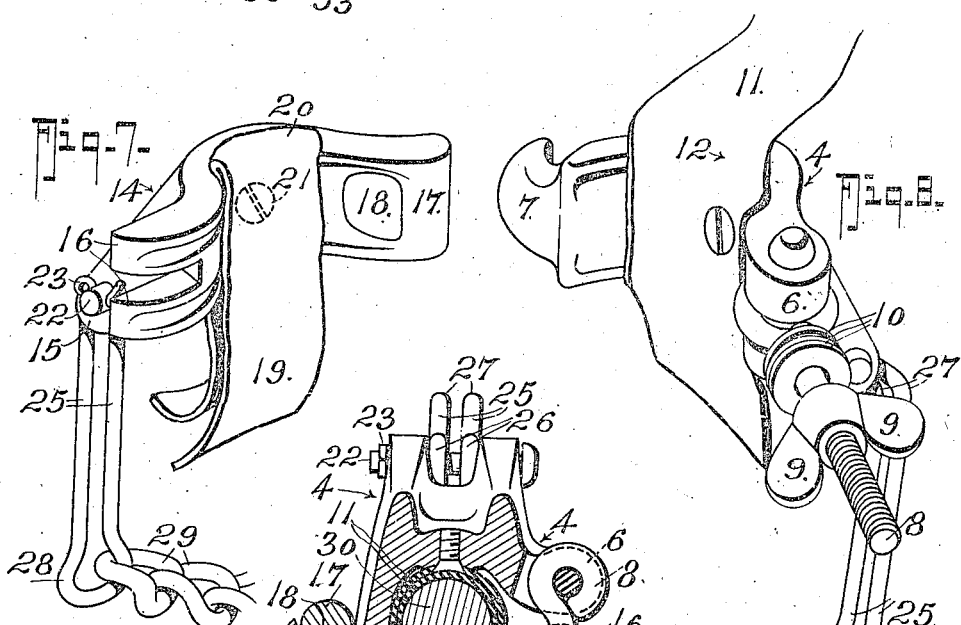

OSCAR FALKENWALDE, OF BALTIMORE, MARYLAND.

ANTISLIPPING DEVICE.

990,531.

Specification of Letters Patent. Patented Apr. 25, 1911.

Application filed October 21, 1910. Serial No. 588,335.

*To all whom it may concern:*

Be it known that I, OSCAR FALKENWALDE, residing at Baltimore, in the State of Maryland, have invented certain new and useful Improvements in Antislipping Devices, of which the following is a specification.

My invention relates to certain new and useful improvements in anti-slipping devices for automobile wheels, and the like, and the invention has for its object to provide an improved form of anti-slipping device which can be quickly attached to the wheel and in which is provided a clamping member to be secured on the spoke of the wheel, the clamping member having arms to embrace the wheel felly, an anti-slipping member to go over the tire tread and rigid link arms pivoted to the clamping arms and connected to the anti-slipping member that passes over the face of the tire.

Other advantageous objects of my invention will be readily apparent to those skilled in the art.

In the drawings,—Figure 1, is a side elevation of the preferred form of my device. Fig. 2, is a cross section through the wheel, showing my device in elevation, the parts being in the normal position. Fig. 3, is a view similar to Fig. 2, showing the tire when compressed by the weight of the machine and showing how the rigid link arms prevent cutting the tire and hold the chain or the member that engages the tread of the tire in its extended position. Fig. 4, is a view similar to Fig. 2 of a modified form of the invention. Fig. 5, is a plan view of the tread engaging plate of the form shown in Fig. 4. Fig. 6, is a modification of the tread engaging plate shown in Fig. 5. Figs. 7 and 8, are detail perspective views of the clamp members separated. Fig. 9, is a section on the line 9—9 of Fig. 1.

Referring now to the accompanying drawings, in which like letters and numerals of reference indicate like parts in all of the figures, 1 designates the felly of the wheel, and 2 the tire receiving channel rim. This rim in the form shown in Figs. 1 to 3 inclusive of the drawings is of the "quick detachable type."

3 designates the tire which may be of any desired construction. All of the foregoing parts may be of the usual construction, as may also be the spokes 30 of the wheel.
My invention includes a sectional clamp composed of two sections 4 and 14, the section 4 including the body that receives the spoke 30, and has arms terminating in a pair of apertured ears 5, which in practice lie close up to the rim 2 of the wheel. The body portion of the clamp section 4 also has laterally projected ears 6 at one side, and a tongue 7 at the other side. Between the ears 6 an eye bolt 8 is mounted, the eye bolt carrying a wing nut 9 and suitable washers 10, as shown.

Secured to the body part of the clamp section 4 is a leather strap 11 which is screwed or otherwise secured at 13 to the clamp section 4, and then folded back upon itself to cover the screw head and prevent its coming in contact with the spoke 30, the fold being made as shown at 12 in the drawings, so that the ends of the strap 11 will project beyond the outer edge of the rim 2 between the felly or rim 2 and the arms 5 of the clamp section 4 and prevent the parts thereof coming in contact with the wheel felly and rim. The other clamp section 14 is made very similar to the section 4 and the body portion of the section 14 has projecting arms 15 terminating in apertured ears, and it also is provided with a pair of laterally projecting lugs 16 at one end, and an apertured lug 17 at the other end, through the aperture 18 of which the tongue 7 of the clamp section 4 projects. The eye bolt 8 passes between the lugs 16 so that the wing nut 9 and washers 10 will rest against the lug 16 and enable the sections 4 and 14 to be tightly clamped to the spoke 30.

The clamp section 14 is also provided with a strap 19 which is secured at 21 to the body part of the clamp section 14 and bent back upon itself at 20 so that the ends of the strap 19 will project beyond the arm 15 and prevent contact between such arm and the rim parts.

Each of the ears of the arms 5 and 15 are apertured to receive pins 22 which are held in place by cotters 23. On the pins 22 are pivoted the rigid arm links 25. The links 25 are formed of a rod bent back upon itself to leave a loop 28, the ends of the rod 25 being bent into eyes 26 to receive the pins 22 and be held between the ears of the arms 5 and 15, as best shown in Fig. 1 of the drawings. The bent back portions of the rod 25 lie parallel to one another, and when the invention is to be used in connection with quick detachable rims the link arms 25 are transversely bent, as at 27, so that they will not come into contact with the rim parts.

The arms 25 extend toward the periphery of the wheel a sufficient distance so that the eyes come approximately half way upon the side of the tire and so that they may connect with the tread engaging anti-slipping member, which in the form shown in Figs. 1 to 3 inclusive of the drawings, consists of a simple link chain 29.

In the preferred form of my invention, shown in Figs. 1 to 3 inclusive of the drawings, it will be observed that by making the arms 5 and 15 project up to near the rim 2, all danger of injuring the rim is avoided, and particularly so when the link arms 25 are used as an intermediate connection between the tread chain 29, and the clamp member. Furthermore, the arms 5 and 15, together with the body portion of the clamp members 4 and 14 serve to form a pocket or channel in which the felly 1 of the wheel rests when the clamp is secured to the spoke 30, and further by using the straps 11 in the manner hereinbefore described and disclosed in the drawings, it will be noticed that no metallic part of the clamp or the screws that secure the straps to the clamp sections can come into contact with the spoke 30 and all danger of marring or injuring the spoke 30 is thereby avoided.

In the form shown in Fig. 4, the link arms or rods 25 are straight where they connect with the clamp arms 5 and 15, and they are linked by link members 31 and 32 to the tread engaging plate 33, the link members 32 passing through apertures 34 in the tread member 33 between the ears 35 thereof. The tread member 33 may be either of the form shown in Fig. 5, or that shown in Fig. 6, depending upon the design of the wheel on which the attachment is to be used, a protecting pad 36 being secured to the plate 33 to prevent the tire being cut or worn out.

The form of my invention shown in Figs. 4, 5 and 6 is best adapted for use on solid tire wheels, although it may also be used on wheels carrying pneumatic tires, but for wheels of the pneumatic tire type I prefer to use the form of invention shown in Figs. 1 to 3 of the drawings.

From the foregoing description, taken in connection with the accompanying drawings, it is thought the complete construction, operation and advantages of my invention will be readily understood by those skilled in the art to which the invention appertains.

What I claim is:

1. An anti-slipping attachment for vehicle wheels comprising a clamping device to clamp around the spoke of the wheel, said clamping device including projecting arms to embrace the wheel felly, said arms terminating in apertured ears, a tread engaging member and link rods pivoted between said ears and connected to said tread engaging member, said link rods being of a length to extend substantially half way upon the side of the tire.

2. An anti-slipping attachment for vehicle wheels, comprising a clamping device to grip the spoke of the wheel, said clamping device including divergingly projecting arms to embrace the wheel felly, said arms terminating in apertured ears, a tread engaging the plate, link rods pivoted between said ears to move in a single plane, and chain links connecting said plate to said rods, said rods extending substantially half way up the side of the tire.

OSCAR FALKENWALDE.

Witnesses:
A. E. DIETRICH,
JOHN T. SCHROTT.